Dec. 1, 1953 L. F. JONES 2,661,467
POSITION LOCATING SYSTEM
Filed Oct. 19, 1951 2 Sheets-Sheet 2
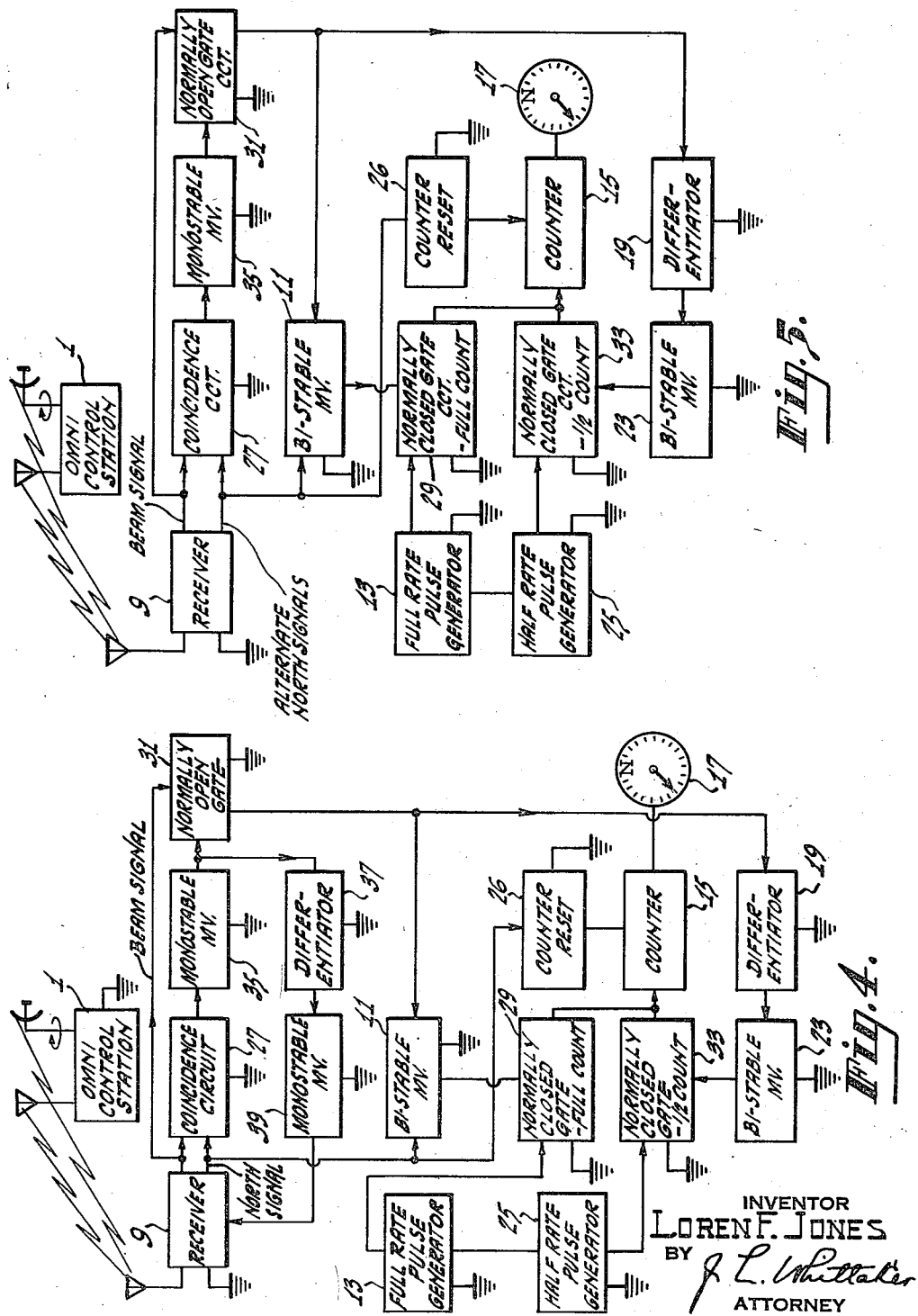
INVENTOR
LOREN F. JONES
BY
J. L. Whittaker
ATTORNEY Patented Dec. 1, 1953

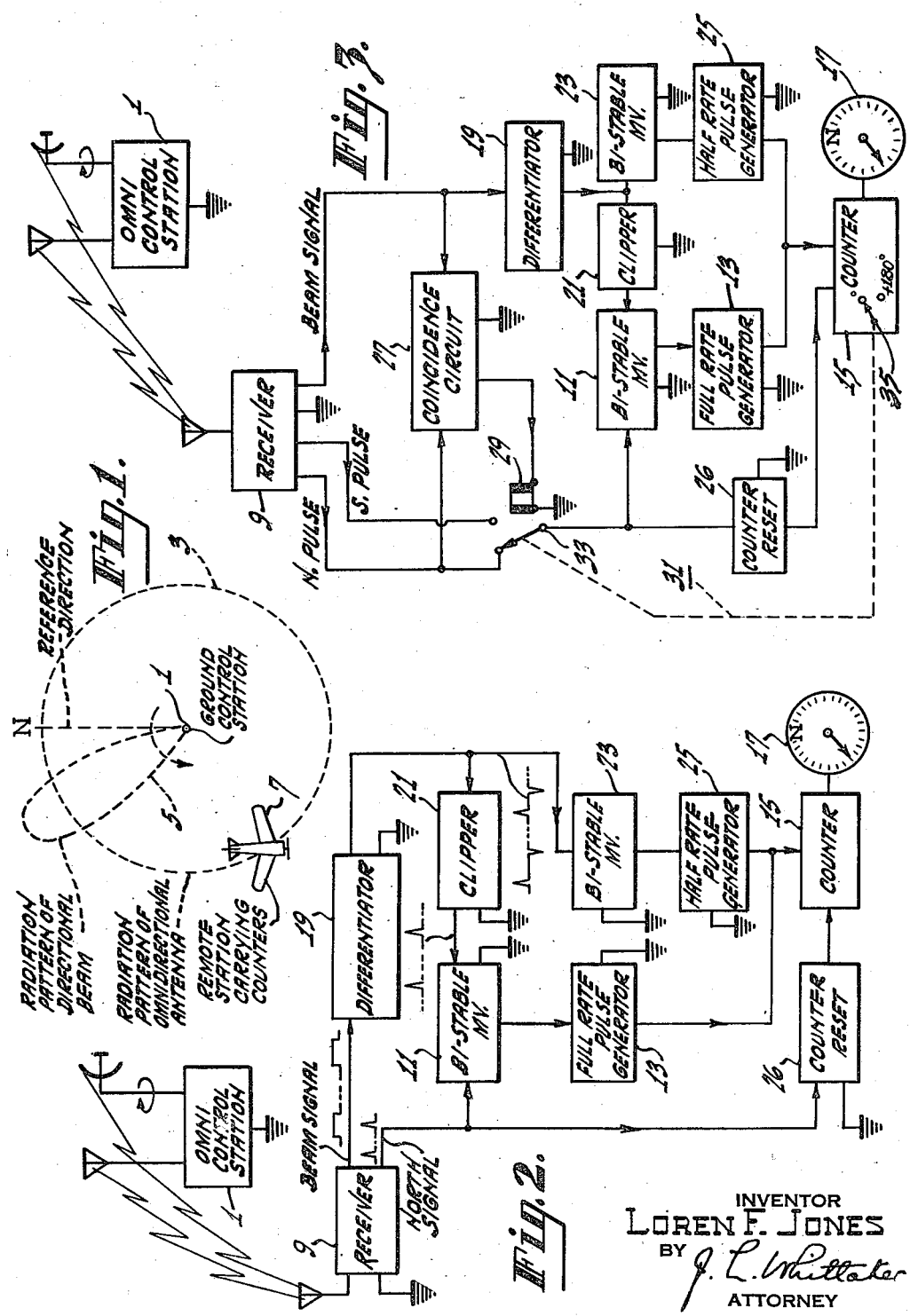

2,661,467

UNITED STATES PATENT OFFICE 2,661,467

POSITION LOCATING SYSTEM

Loren F. Jones, Philadelphia, Pa., assignor to Radio Corporation of America, a corporation of Delaware Application October 19, 1951, Serial No. 252,142

15 Claims. (Cl. 343—106)

This invention relates generally to radio navigation and more particularly to a method of and means for accurately locating the angular disposition of a remote mobile vehicle, for example, an aircraft, with respect to a control station.

One means proposed for locating the angular disposition of a mobile station with respect to a control station is to employ a rotating antenna emitting a beam of energy of small angular width together with the omnidirectional emission of a signal at some reference direction of the rotating beam. For example, a directional beam of energy is rotated azimuthally at a constant rate and an omnidirectional signal is emitted each time the directional beam is pointing at some predetermined reference direction, such as north. When the mobile station is supplied with information as to the rate of rotation of the directional beam, the azimuth bearing of the mobile station with respect to the control station may be readily determined by the interval between reception of the omnidirectional reference signal and the reception of the rotating beam signal.

A difficult problem encountered in such systems results from the finite width of the rotating beam which generally is such that the system error exceeds that value necessary for the system to enjoy practical use. In some systems the beam width may be from 20° to as much as 60°, hence an operator at a mobile station may find a computation to be in error by the entire angular width of the beam. Furthermore, the apparent beam width at the mobile station may be different at different distances of the mobile station from the ground station. Considerable inaccuracy has resulted heretofore from position location as above described, the inaccuracy resulting mainly from the width of the rotating beam.

The present invention reduces the amount of inaccuracy in previous such systems, assuming symmetry of the rotating beam, by locating the central axis of the beam thereby effectively resolving the beam width.

An object of the present invention is to accurately locate the central axis of a rotating directional beam signal.

Another object of the present invention is to improve the accuracy of position locating systems employing a rotating beam of signal energy and a reference omnidirectional signal.

A further object of the invention is to provide a method of and means for overcoming the inaccuracy, in such systems, of position locating which inaccuracy is caused by the beam width of the rotating beam signal.

A still further object of the invention is to determine the time at which the central axis of the beam in such a system crosses, or is aligned with, a remote mobile station.

In practicing a preferred embodiment of the invention, a beam of energy is radiated by and is azimuthally rotated about, at a predetermined rate, a ground omni control station. An omnidirectional signal is also radiated at predetermined intervals of time synchronized with the directional beam rotation. At a remote mobile station, a full rate time count is initiated upon reception of the omnidirectionally radiated signal. At the time at which the leading edge of the directional beam contacts the remote station, the full rate count is stopped and a half-rate count is begun. The half-rate count continues until the beam signal no longer contacts the remote station, the counting then ceasing. Assuming that the beam is symmetrical about its central axis, this axis is effectively located since the count obtained as above described is the same count which would be obtained if the counter began counting at full rate with the reception of the omni reference signal and ceased counting when the central axis of the beam was aligned with the remote mobile station.

The simple method outlined above, however, is susceptible to providing an incorrect reading if a mobile station is within one-half the directional beam width of the reference direction. In this "dead zone," a mobile station may receive the omnidirectional signal and the beam signal simultaneously. This may disrupt the counting such that an incorrect computation is derived.

One method of obviating this inaccuracy, according to the invention, is to radiate two omnidirectional signals, one being radiated when the beam axis is the reference direction and the other when the beam is at a substantial angle from the reference direction. Then, if the beam signal and the first omnidirectional signal overlap, the time count may be initiated by reception of the second omnidirectional signal. Suitable counter correction is provided therefor.

A second manner in which the described "dead zone" inaccuracy may be overcome is, after an overlapping of omni and beam signals, to prevent an erroneous half-rate count from starting by suppressing the beam signal and to suppress the next successive received omni signal. The half count is then taken on the second rotation of the beam and will not be in error because the next omni signal is suppressed. This, as hereinafter will be shown in detail, prevents arriving at an erroneous indication. An additional mode of operation is afforded wherein this ambiguity is resolved by radiating the omnidirectional signal once every other time the directional beam passes the reference direction. According to this feature of the invention, the full and half rate counts may be made without interference therebetween.

The invention will be described in greater detail with reference to the accompanying drawing in which Figure 1 is a map illustrating the radiation patterns of signals utilized, according to the method of the invention, in determining the positional location of a remote mobile station; Figure 2 is block schematic diagram of a position locating system, according to the invention, in which full and half-rate counts initiated respectively by the reception of an omnidirectional reference signal and a rotating beam signal are utilized for indicating the position of a remote mobile station with respect to an omni control station; Figure 3 is a block schematic diagram of a modification of the system of Figure 2, according to the invention, in which a pair of transmitted omnidirectional signals are utilized in obviating a "dead zone" error introduced therein; Figure 4 is a block schematic diagram of a further modification of the system of Figure 2, according to the invention, in which "dead zone" errors are substantially eliminated by suppressing alternate received omni signals; and Figure 5 is a schematic block diagram of a position locating system, according to the invention, in which the "dead zone" errors are obviated by transmitting an omnidirectional signal synchronized with but during alternate revolutions of the rotating directional beam.

Similar reference characters are applied to similar elements throughout the drawing.

Referring to Figure 1 of the drawing, a ground control station 1 radiates an omnidirectional reference signal and also radiates a directional beam signal which is rotated about the control station 1 at some predetermined rate, which may be of the order of sixty rotations per minute. The radiation patterns of the omni and directional signals are indicated at 3 and 5, respectively. It is apparent that the angular disposition of a mobile station, such as an aircraft 7, may be determined, for a given rotational rate of the directive beam, by measuring the elapsed time between the reception at the aircraft of the omnidirectional signal and the reception of the directive beam signal. The accuracy of such a measurement is relatively poor, however, since the beam width of the directional beam may be excessive and effectively vary with range.

According to the invention and with reference to Figure 2, the angular disposition of a remote mobile station, such as is indicated by the aircraft 7, may be accurately determined as follows. The ground control station 1 radiates a directional beam signal which continuously is rotated thereabout at a predetermined rate. Each time the central axis of this beam signal is aligned with a reference point, such as north, the ground station 1 also radiates an omnidirectional signal. At the craft 7, which is supplied with information relating to the aforesaid directional beam rotational rate, the omnidirectional signal is detected and coupled to a receiver 9. The omnidirectional, or north, signal obtained therefrom is applied to a bi-stable or Eccles-Jordan type multivibrator 11. The multivibrator output is of the proper polarity to actuate a "full rate" pulse generator 13. The pulses produced thereby may be counted by either a binary or decimal counter 15, which count is subsequently displayed on an indicator device 17.

The rotating beam signal is later received by the craft 7 and is applied to a differentiator circuit 19. The initial excursion of the differentiated beam signal, for example, a positive excursion, corresponds to the reception of the leading edge of the beam signal. The positive going signal is coupled through a clipper circuit 21 to the previously mentioned bi-stable multivibrator 11 reversing its output signal polarity and interrupting the full rate count. Simultaneously, the positive going excursion triggers a second bi-stable multivibrator 23 which actuates a second pulse generator 25 producing output signals at one-half full rate. The counter 15 is also connected to the half-rate pulse generator 25. The half-rate count is continued until the negative going excursion of the differentiated beam signal, corresponding to the trailing edge thereof, triggers and reverses the polarity of the second multivibrator 23. The function of the clipper circuit 21 is to prevent the negative excursion of the differentiated beam signal from re-initiating a full rate count after the cessation of the half count. From the foregoing description, it is apparent that the full rate count, initiated upon reception of the reference omnidirectional north signal and sustained until the reception of the leading edge of the beam signal, plus the half full-rate count, initiated upon reception of the leading edge of the beam signal and maintained until the signal is last received by the aircraft 7, provides the same total count that would be derived if the counter 15 counted at full rate from the reception of the north signal until the central axis of the beam is aligned with the craft. A counter reset 26 is provided which preferably is actuated by north signals occurring after each computation.

It should be noted, however, that the simple method of and means for position locating, as outlined above, may provide an erroneous indication if a mobile station is located within one-half beam width of the reference direction. Assume, for example, that the aircraft 7 is five degrees west of north and that the beam width of the directional beam is 20°. For a correct count to be obtained, the full rate count should start with the reception of the omnidirectional signal. With the craft located five degrees west of north, the beam signal is received thereby before the beam axis is aligned with north and the omnidirectional signal is emitted. Furthermore, for a certain period of time the beam and omni signals are received simultaneously, hence it is indeterminate which pulse generator, 13 or 25, is enabled.

The undesirable miscomputation which may be derived in this "dead zone" may be avoided by a modification of the herein disclosed and claimed position locating system, in which a second omnidirectional reference signal is transmitted by the ground omni station 1. At the time the second omnidirectional reference signal is transmitted, the angular disposition of the central axis of the rotating beam from the reference direction should be greater than one-half the beam width of the rotating beam. For the example set forth below, the second or auxiliary, omni signal is assumed to be emitted when the central axis of the beam signal is aligned with south.

In a second embodiment, according to the invention and with reference to Figure 3, the circuit operation is as described with reference to Figure 2 when the mobile station is not located in the dead zone. When, however, the aircraft 7 is in the dead zone and receives the beam signal and the omnidirectional north signal simultaneously, a pulse coincidence circuit 27 produces an output signal of polarity sufficient to energize a solenoid 29 operating a two-gang single pole-double throw switch 31. The coincidence circuit time delay is adjusted to engage the switch for several revolutions of the rotating beam. The first section 33 of the two-gang switch 31 connects the bi-stable multivibrator 11, associated with the full rate pulse generator 13, to the receiver 9 such that the full rate time count is initiated upon reception of the south omnidirectional signal. The second section 35 of the switch 31 adjusts the counter 15 such that 180° is added to the counted azimuth. It is clear that the north and south omnidirectional pulses must differ with respect to each other, for example, by pulse width modulation or by multiple pulse group coding. If desirable, the 180° azimuth correction may be obtained by correcting the indicator 17 rather than by correcting the registered count. A counter reset 26 is again provided which is responsive to the next successive omni pulse which is utilized as a time count reference.

A further modification of the system of Fig. 2, according to the invention, will be described with reference to Figure 4. For normal system operation, the reception at the craft 7 of the ground omni station north signal triggers a bi-stable multivibrator 11 which opens a normally closed gate 29. The gate 29 connects the full rate pulse generator 13 to the counter 15. The beam signal is later received, coupled through a normally open gate 31 and differentiated in a differentiator circuit 19. The beam signal is also applied to the multivibrator 11 reversing its output polarity thereby stopping the full rate count. The positive and negative excursions of the differentiated signal, corresponding to the leading and trailing edges of the beam signal, operate a bi-stable multivibrator 23 such that a normally closed gate circuit 33 connected thereto permits signals produced by the half-rate pulse generator 25 to be counted. The next successive north pulse preferably operates a counter reset 26 which returns the counter 15 to zero and displays the previous count on the indicator 17.

When a craft is within the "dead zone," the simultaneous reception of the reference omnidirectional north signal and the beam signal produces an output signal from a pulse coincidence circuit 27 which is coupled to a monostable multivibrator 35. The multivibrator time delay is sufficient for the aforementioned normally open gate 31 to be kept closed the entire time during which the rotating beam is sweeping across the remote craft. The monostable multivibrator signal is then differentiated in another differentiator circuit 37, the output of which triggers a second monostable multivibrator 39. The delay of this multivibrator is sufficient to suppress the next received north pulse. It may then be seen that the full count is started with the reception of a given omni north pulse and the half-rate count is initially suppressed for a time slightly greater than that required for the directive beam to sweep past the craft 7. The next successive received north signal is also suppressed so that it will not interfere with the beam signal, the counting thereafter proceeding in a normal manner.

In Figure 5, a further modification of the invention is disclosed wherein the dead zone error is eliminated by ground station emission of an omnidirectional reference pulse during alternate revolutions of the rotating beam. The system herein illustrated is analogous to the system of Figure 4. Since a north pulse is emitted every other time the central axis of the rotating beam is aligned with north, a positional indication is obtained only during alternate beam revolutions. When the craft is located within one-half beam width of north, the coincidence and monostable multivibrator circuitry 27 and 35 prevent the beam signal from starting the half-rate count. The half count is started, however, when the leading edge of the rotating beam contacts the remote station the second time around. Since there is no emission of a north signal on alternate beam rotations, no interference between the two signals occurs and the indicator 17 provides an accurate reading of the counter computation.

Thus, in accordance with the invention, there is disclosed a simple method for locating the angular disposition of a remote station with reference to a ground control station. The aforementioned dead zone error has been obviated in a relatively simple manner. The various embodiments of the invention disclose typical modes of system operation falling within the broad teachings of the invention. While the invention has been described as utilized with a continuously radiated rotating beam, it is obvious that the invention is adaptable for use with a repetitive signal or radar system. It should also be noted that the counting need not be aboard the craft. Coded transponder signals from the craft may be received at the ground station for counting purposes and the information derived utilized as desired.

What is claimed is:

1. The method of determining the angular disposition of a mobile station with respect to a reference direction from a point, comprising the steps of radiating a signal from said point in a directional beam, rotating said beam about said point at a predetermined rate, omnidirectionally radiating a signal at selected times at which said beam passes through said reference direction, initiating a time count at a rate determined by said beam rotation on reception at said station of certain ones of said omnidirectional signals, counting at said rate until said directional beam is first received and utilized at said station, counting at half rate until said directional beam signal is last received and utilized at said station and thereafter ceasing to count, the count between the reception of said omnidirectional signal and the last utilization of said directional beam signal being a measure of the angular disposition of said mobile station with respect to said reference direction.

2. The method of determining the angular disposition of a mobile station with respect to a reference direction from a point, comprising the steps of radiating a signal from said point in a directional beam, rotating said beam about said point at a predetermined rate, omnidirectionally radiating a signal at the time at which the central axis of said beam passes through said reference direction, initiating a time count at a rate determined by said beam rotation on reception at said station of said omnidirectionally radiated signal, counting at said rate until said directional beam signal is first received at said station, counting at half-rate until said directional beam signal is last received at said station and thereafter ceasing to count, the count between the reception of said omnidirectional signal and the last reception of said directional beam signal being a measure of the angular disposition of said station with respect to said reference direction.

3. The method of determining the angular disposition of a mobile station with respect to a reference direction from a point, comprising the steps of radiating a signal from said point in a directional beam, rotating said beam about said point at a predetermined rate, omnidirectionally radiating a plurality of differently occurring signals one of which signal radiations occurs when the central axis of said directional beam passes through said reference direction, initiating a time count at a rate determined by said beam rotation on reception at said station of one of said omnidirectionally radiated signals, counting at said rate until said directional beam signal is first received at said station, counting at half-rate until said directional beam signal is last received at said station and thereafter ceasing to count, the count between the reception of one of said omnidirectional signals and the last reception of said directional beam being a measure of the angular disposition of said station with respect to said reference direction.

4. The method of determining the angular disposition of a mobile station with respect to a reference direction from a point, comprising the steps of radiating a signal from said point in a directional beam, rotating said beam about said point at a predetermined rate, omnidirectionally radiating a signal at selected times at which the central axis of said beam passes through said reference direction, initiating a time count at a rate determined by said beam rotation on reception and utilization at said mobile station of omnidirectional signals radiated during alternate revolutions of said rotating beam, counting at said rate until said beam is first received and utilized at said station, counting at half rate until said directional beam signal is last received and utilized at said station and thereafter ceasing to count, the count between the reception of said omnidirectional signal and the last utilization of said directional beam signal being a measure of the angular disposition of said mobile station with respect to said reference direction.

5. A system for determining the angular disposition of a mobile station with respect to a reference direction from a control station comprising; at said control station, means for radiating a directive beam of signal energy, said beam being rotated about said control station at a predetermined rate, means synchronized with the rotation of said directive beam for radiating an omnidirectional signal at selected times at which the central axis of said directional beam is aligned with said reference direction; and at said mobile station, receiver means for receiving said beam and omnidirectional signals, and means sequentially actuated by said omnidirectional and beam signals for producing different rate time counts, the total of said counts being a measure of the angular disposition of said mobile station with respect to said reference direction.

6. A system for determining the angular disposition of a mobile station with respect to a reference direction from a control station comprising; at said control station, means for radiating a directive beam of signal energy, said beam being rotated about said control station at a predetermined rate, means synchronized with the rotation of said directive beam for radiating an omnidirectional signal at selected times at which the central axis of said directional beam is aligned with said reference direction; and at said mobile station, receiver means for receiving said beam and omnidirectional signals, means responsive to the reception of said omnidirectional signal for initiating a time count at a first rate, and means operable in response to reception of said beam signal for simultaneously interrupting said first count and initiating a second count at one half the rate of said first count, said second count being maintained for the period of reception of said beam signal by said mobile station and all counting ceasing thereafter, the total count derived being a measure of the angular disposition of said mobile station with respect to said reference direction.

7. A system for determining the angular disposition of a mobile station with respect to a reference direction from a control station comprising; at said control station, means for radiating a directive beam of signal energy, said beam being rotated about said control station at a predetermined rate, means synchronized with the rotation of said directive beam for radiating an omnidirectional signal each time the central axis of the directive beam is aligned with said reference direction; and at said mobile station, receiver means for receiving said omnidirectional and beam signals, a first pulse generator responsive to said omnidirectional signal for producing a series of repetitive signals at a first rate, a second pulse generator, means responsive to said beam signal for disabling said first pulse generator and actuating said second pulse generator to produce a series of repetitive pulses therefrom at one half said first rate, said second pulse generator being actuated for the period of reception of said beam signal, and counter means connected to said pulse generators for counting said repetitive pulses, the total count derived being a measure of the angular disposition of said mobile station with respect to said reference direction.

8. A system for determining the angular disposition of a mobile station with respect to a reference direction from a control station comprising; at said control station, means for radiating a directive beam of energy, said beam being rotated about said control station at a predetermined rate, means synchronized with the rotation of said directive beam for radiating a plurality of differently occurring omnidirectional signals separated from each other an amount in time greater than one half the beam width of said directive beam, one of said omnidirectional signals being radiated at the time at which the central axis of said directive beam is aligned with said reference direction; and at said mobile station, receiver means for selectively receiving said omnidirectional and beam signals, a first pulse generator means responsive to reception of one of said omnidirectional signals for producing a series of repetitive pulses at a first rate, a second pulse generator, means responsive to said beam signal for disabling first pulse generator and actuating said second pulse generator to produce therefrom a series of repetitive pulses at one half said first rate, said second pulse generator being actuated for the period of reception of said beam signal, and counter means connected to said pulse generators for counting said repetitive pulses, the total count derived being a measure of the angular disposition of said mobile station with respect to said reference direction.

9. In a system as claimed in claim 7, mobile station apparatus responsive to the simultaneous reception of said omnidirectional and beam signals for suppressing alternate omnidirectional signals and for obtaining said half count during alternate revolutions of said directive beam, said apparatus comprising pulse coincidence means for producing an output signal in response to the simultaneous reception of said omnidirectional and beam signals, means coupled to said pulse coincidence means actuated by said output signal for suppressing said beam signal for a fractional portion of the rotation thereof, and means including time delay means responsive to said output signal for suppressing alternate omnidirectional signals radiated by said ground station.

10. In a system as claimed in claim 8 in which said first count normally is initiated upon reception of the omnidirectional signal radiated by said control station at the time at which the central axis of said directive beam is aligned with said reference direction, mobile station apparatus responsive to the simultaneous reception of said beam and reference omnidirectional signal for delaying the initiation of said first count comprising, a coincidence circuit for producing an output signal indicative of said simultaneous signal reception, and switching means coupled to said coincidence circuit for connecting said first generator to said receiver such that said first count is initiated upon reception of a different one of said omnidirectional signals.

11. A system as claimed in claim 10 wherein said switching means includes means for adjusting said total count to compensate for the delay of the initiation of said first count.

12. For use in a system for determining the angular disposition of a mobile station with respect to a reference direction from a control station which system includes at said control station, means for radiating a directive beam of signal energy, said beam being rotated about said control station at a predetermined rate, and means synchronized with the rotation of said directive beam for radiating an omnidirectional signal at selected times at which the central axis of said directive beam is aligned with said reference direction; apparatus comprising, a receiver for receiving said beam and omnidirectional signals, means responsive to the reception of said omnidirectional signal for initiating a time count at a first rate, and means operable in response to reception of said beam signal for simultaneously interrupting said first count and initiating a second count at one half the rate of said first count, said second count being maintained for the period of reception of said beam signal by said mobile station and all counting ceasing thereafter, the total count derived being a measure of angular disposition of said mobile station with respect to said reference direction.

13. For use in a system for determining the angular disposition of a mobile station with respect to a reference direction from a control station which system includes at said control station, means for radiating a directive beam of signal energy, said beam being rotated about said control station at a predetermined rate, and means synchronized with the rotation of said directive beam for radiating an omnidirectional signal each time the central axis of said directive beam is aligned with said reference direction; apparatus comprising, a receiver for receiving said omnidirectional and beam signals, a first pulse generator responsive to said omnidirectional signal for producing a series of repetitive signals at a first rate, a second pulse generator responsive to said beam signal for disabling said first pulse generator and actuating said second pulse generator to produce a series of repetitive pulses therefrom at one half said first rate, said second pulse generator being actuated for the period of reception of said beam signal, and counter means connected to said pulse generators for counting said repetitive pulses, the total count derived being a measure of the angular disposition of said mobile station with respect to said reference direction.

14. Apparatus as claimed in claim 13 including, pulse coincidence means for producing an output signal in response to the simultaneous reception of said omnidirectional and beam signals, means coupled to said pulse coincidence means actuated by said output signal for suppressing utilization of said beam signal for a fractional portion of the period of reception thereof, and means including the delay means responsive to said output signal for suppressing utilization of alternate omnidirectional signals radiated by said current station.

15. In a system for determining the angular disposition of a mobile station with respect to a reference direction from a control station which system includes; at said control station, means for radiating a directive beam of energy, said beam being rotated about said control station at a predetermined rate, means synchronized with the rotation of said directive beam for radiating a plurality of differently occurring omnidirectional signals separated from each other an amount in time greater than one half the beam width of said directive beam, one of said omnidirectional signals being radiated at the time in which the central axis of said directive beam is aligned with said reference direction; at said mobile station, a receiver for receiving said omnidirectional and beam signals, a first pulse generator responsive to reception of the omnidirectional signal radiating at the time at which the central axis of said beam is aligned with said reference direction for producing a series of repetitive signals at a first rate, a second pulse generator responsive to said beam signal for disabling said first pulse generator and actuating said second pulse generator to produce a series of repetitive pulses therefrom at one half said first rate, said second pulse generator being actuated for the period of reception of said beam signal; the improvement comprising, a coincidence circuit for producing an output signal indicative of simultaneous reception at said mobile station of said omnidirectional signal and said beam signal, and switching means coupled to said coincidence circuit and responsive to said output signal for connecting said first generator to said receiver such that said first count is initiated upon reception of a different one of said omnidirectional signals.

LOREN F. JONES.

References Cited in the file of this patent

UNITED STATES PATENTS

| Number | Name | Date |
|---|---|---|
| 1,135,604 | Meissner | Apr. 13, 1915 |
| 2,156,060 | Muller | Apr. 25, 1939 |
| 2,184,843 | Kramar | Dec. 26, 1939 |